July 2, 1946.  F. NELL  2,403,015

THREAD CUTTING MECHANISM

Filed Feb. 23, 1944  4 Sheets—Sheet 4

Inventor
Frederic Nell,
By Strauch & Hoffman
Attorneys

Patented July 2, 1946

2,403,015

UNITED STATES PATENT OFFICE 2,403,015

THREAD CUTTING MECHANISM

Frederic Nell, Waynesboro, Pa., assignor to Landis Machine Company, Waynesboro, Pa., a corporation of Pennsylvania Application February 23, 1944, Serial No. 523,599

26 Claims. (Cl. 10—145)

This invention relates to thread cutting mechanism of that general class in which an internal or external tapered thread is cut on the work by a plurality of threading elements to which radial movement is imparted during the thread cutting action to control the taper, and, at the conclusion of the threading operation, said elements are rapidly retracted from the work to permit the ready withdrawal of the mechanism.

More particularly, my present invention provides certain important practical improvements in prior art developments, including those disclosed in Patents 2,283,280, May 19, 1942, and 2,291,744, August 4. 1942, to Frederic Nell and Patent 1,811,802, June 23, 1931, to Samuel F. Newman, respectively. For the purposes of this explanation I have shown such improvements as applied to a collapsible tap of the receding type, for generating an internal thread on pipes or other tubular members commonly employed in the oil, and steam fittings equipment supply industries. However, as will become evident from the following detail description, the novel features of my invention are also applicable to die heads for cutting external threads, and, in said description, and in the claims the expressions "thread cutting mechanism" and "collapsible tap" are intended to generically include both of these well known types of thread cutting machines.

In thread cutting mechanisms of the prior art, such for instance as that shown in Patent 1,811,-802, the means for producing the thread taper embodies a large number of contacting, relatively sliding parts between which it is difficult and expensive to maintain close fits during the life of the machine. This was particularly true of the operation of the tripping cams and gibs which control the accuracy of the taper being generated and, it was found that, over a period of time, the wear between these parts caused irregular tapers. The importance of a high degree of accuracy in the operation of such mechanisms becomes apparent in view of the fact that the present trend of industry in this respect has been accelerated by standards recently established for Army and Navy Aeronautical and Ordnance requirements, and the development of more efficient gauges and thread checking means.

It is, therefore, one of the primary objects of my invention to provide a thread cutting mechanism, in which the number of relatively sliding elements comprised in the taper control means is reduced to a minimum, and in which such sliding movements are comparatively short, so that the final taper is not affected by such wear as does occur, thus assuring a high degree of accuracy and uniformity of thread taper in the operation of the mechanism.

Another important object is to provide a taper control mechanism in which lost motion is eliminated to thereby insure a continuous and uniform taper of the thread being generated.

A further object of the invention is to provide a compact, rugged and rigid construction which embodies a comparatively small number of elements of simple mechanical forms for the control of position, diameter, taper and length of the thread to be cut.

An additional object is to provide a novel multiple section plunger mechanism for receding and retracting the thread cutting elements, and novel means for functionally co-ordinating a thread taper controlling lever therewith.

It is also an important object of the invention to provide a collapsing or retracting spring which is not affected by the receding action of the plunger mechanism and remains under a single, uniform tension for all diameters to be threaded within a predetermined range.

A very practical objective of my present improvements is to materially simplify and increase the serviceable life of the plunger latching means, in mechanisms of this kind, and to provide a latch keeper element in the form of an adjustable and readily replaceable, inexpensive repair part.

The invention has for another of its objects the provision of a sliding, adjustable, latch tripping key, whereby different thread lengths may be cut without disturbing the diametrical adjustment of the cutter actuating head.

As a further contribution to the art my invention provides a novel means for adjusting the fulcrum axis of the taper control lever so that the thread taper may be readily varied, plus or minus, from a predetermined norm.

Preferably, I also propose to employ a cutter or tap carrying head which is removably secured to the end of the tool body, so that heads, with different forms and arrangements of the cutters, may be interchangeably used with a single body, thus materially increasing the utilitarian advantages of the invention.

In general, it is the aim and purpose of my present invention to provide a thread cutting mechanism as above characterized, which is distinguished by simplicity of design, low initial and upkeep cost, positive and efficient functional operation, and the ability to cut threads in an extensive range of tapers with maximum accuracy and uniformity throughout the useful life of the tool.

Other subordinate but nonetheless important objects of my invention will become apparent from the following description and subjoined claims when considered in connection with the accompanying drawings, in which:

Figure 7 is an end elevation of the detachable bracket showing the fulcrum means for the taper control lever mounted therein; and Figure 8 is a detail view on an enlarged scale showing the fulcrum adjusting means for varying the thread taper.

Figure 1:
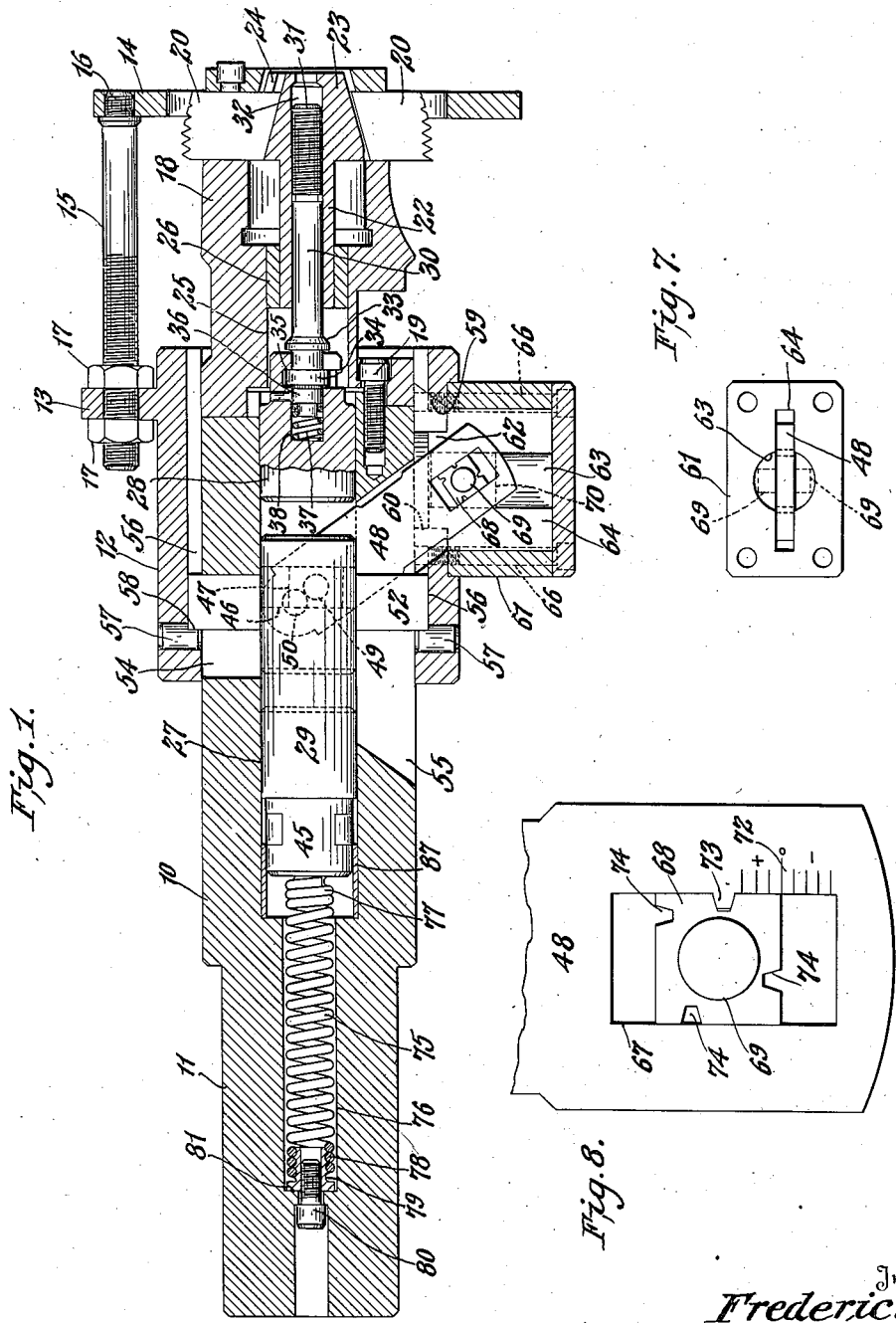
Figure 1 is a vertical longitudinal sectional view taken substantially on the line 1—1 of Figure 5, showing the mechanism in set position at the start of the threading operation.

In these drawings, by way of example, I have fully disclosed one concrete embodiment of a preferred form of the several novel features of my present invention, as applied to a well known type of receding collapsible tap. Thus, as in the above referred to Patent No. 1,811,802 the elongated, cylindrical body 10 is provided at its rear end with a reduced shank extension 11 for connection with the vertical or horizontal spindle of a drill, lathe or other suitable driving machine. This tap body is circumscribed by a longitudinally slidable sleeve 12 having a plurality of radially projecting apertured lugs 13 adjacent to its forward end. A ring 14 is adjustably and rigidly supported in forwardly spaced relation from the sleeve 12 by the rods 15 having studs 16 at their forward ends threaded into the ring 14. The threaded rear ends of these rods extend through the apertured lugs 13 and are adjustably locked in connection therewith by the nuts 17 tightly engaged with opposite side faces of said lugs.

The sliding sleeve is the primary control means for the tap receding and retracting mechanism and, to the extent above described, the present disclosure is characteristic of current practise in the art.

Figure 2:
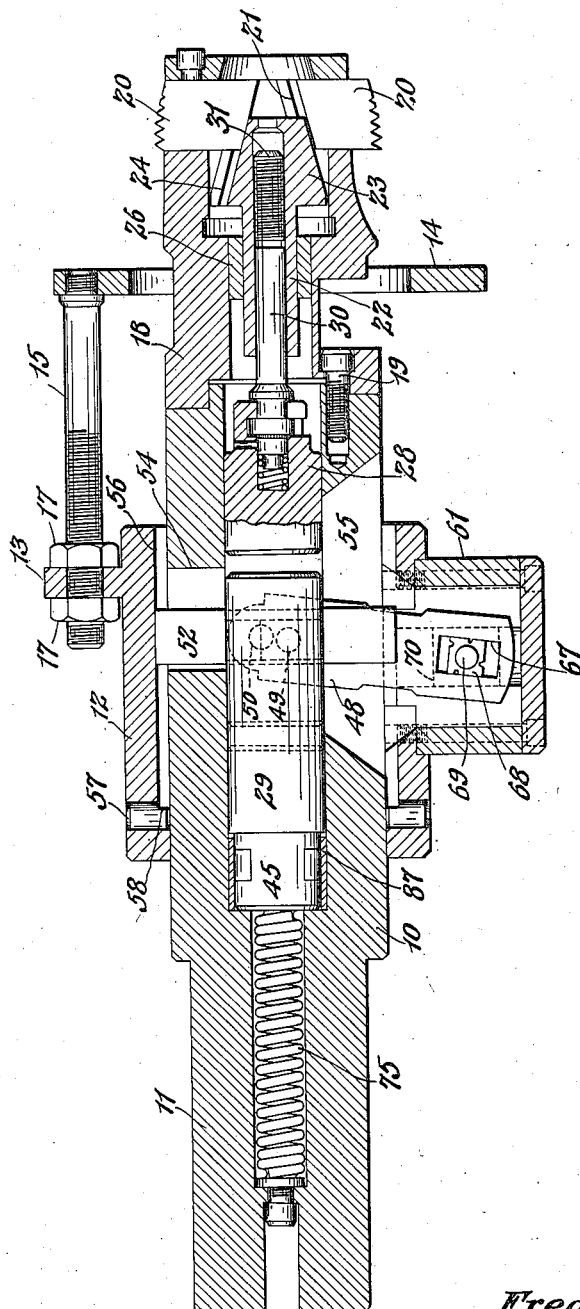
Figure 2 is a similar view showing the threading elements retracted and the parts of the mechanism in collapsed position.

To the forward end of the body 10, and, in effect, constituting an integral extension thereof, the tap carrying head 18 is, preferably, detachably secured by a plurality of bolts, in the manner shown at 19 in Figures 1 and 2. This head carries the radially adjustable taps, chasers, or cutting elements 20 having obliquely inclined inner ends provided with keyways 21 with which similarly inclined keys 24, formed on the tapering truncated head 23 of the forward plunger section 22, are adapted to coact in the customary well known manner to radially expand, recede and retract said cutting elements. The head 18 has a longitudinal bore 25 in the other end of which a guide sleeve 26 for the plunger section 22 is fixed.

The body 10 has an axial bore 27 extending substantially the entire length thereof and with the forward end of which the bore 25 of the head 18 is in aligned connection. The other sections 28 and 29, respectively, of the multi-sectional plunger structure have unitary and relative reciprocating movement in the bore 27.

The intermediate plunger section 28 is connected with the front section 22 of the plunger by means of the adjusting rod 30, the forward end 31 of which has threaded engagement with a threaded section of the bore 32 of the plunger section 22. Adjacent to its rear said screw is formed with spaced collars 33 and 34 between which the slotted wall of a socket 35 formed on the forward end of plunger section 28 is received. The rear face of collar 34 is serrated for engagement by the serrated end of a locking element 36 which is urged to locking position by the spring 37 in recess 38 of the plunger section 28. This adjustment and locking means for plunger section 22, to predetermine the normal diametrical position of the cutting elements relative to the plunger axis, as seen in Figure 2. is similar to that disclosed in Patent No. 2,233,280 above identified.

Figure 3:
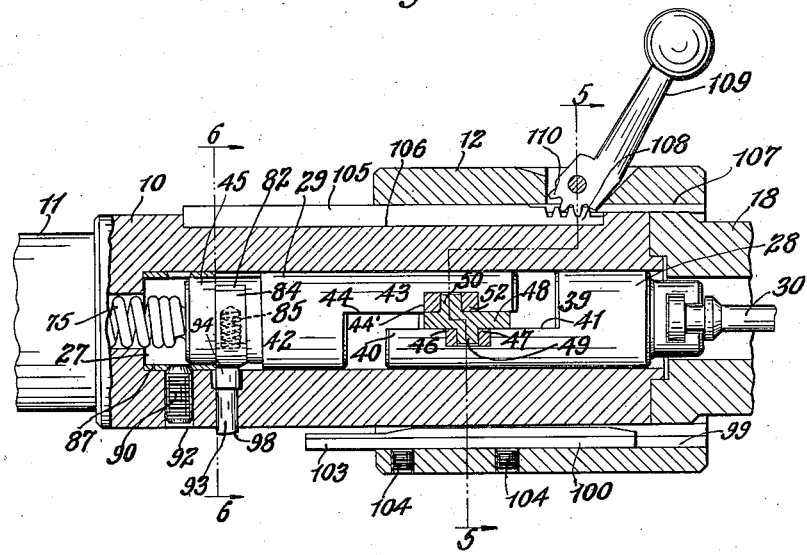
Figure 3 is a fragmentary horizontal sectional view taken substantially on the line 3—3 of Figure 6, the parts being latched in the set position of Figure 1.
Figure 4:
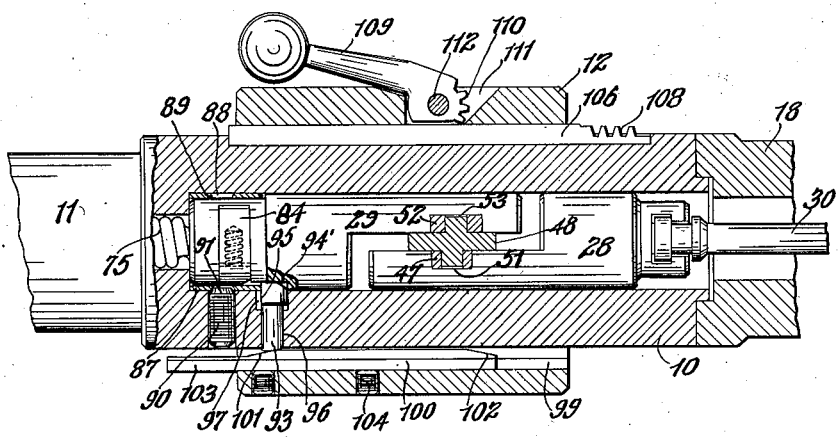
Figure 4 is a similar view, with parts in the collapsed position of Figure 2.

Referring now to Figures 3 and 4 of the drawings, it will be noted that the plunger section 28 includes a short cylindrical forward end portion 39 and a relatively long rearwardly extending semi-cylindrical part 40, the curved surface of which has the same radius as the part 39 and describes an arc of less than 180° to thereby provide a flat inner surface 41 at one side of the axial center of bore 27. Similarly the rear plunger section 29 includes a rear cylindrical portion 42 and a relatively long forwardly extending part 43, corresponding in cross-sectional shape and dimensions to the part 40 of plunger section 28, and having an inner flat face 44 at the opposite side of the axial center of bore 27 and in opposed, overlapping, spaced relation to the surface 41 of said part 40 of the plunger section 28. The free end of each part 40 and 43 of the respective plunger sections is longitudinally spaced from the opposed end of the part 42 and 39, respectively, of the other plunger section. The part 42 of plunger section 29 is also formed with a reduced cylindrical terminal extension 45 at its rear end for a purpose which will be presently explained.

Figure 5:
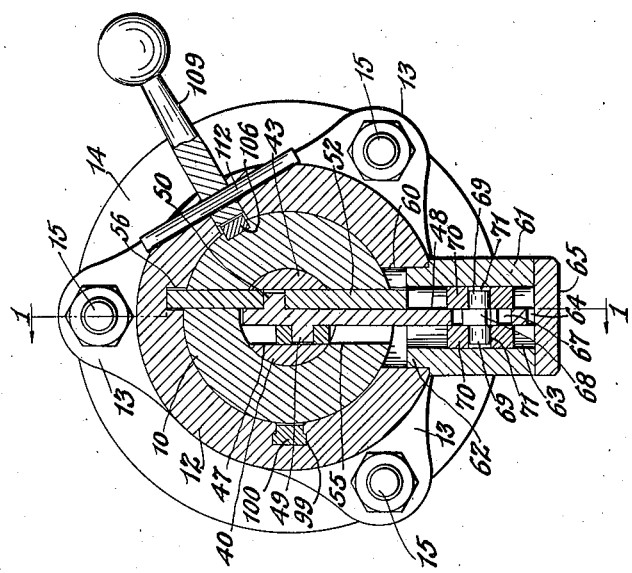
Figure 5 is a transverse sectional view taken substantially on the line 5—5 of Figure 3.

The face 41 of plunger section 28 is provided, intermediate of its ends, with a transverse slot 46 in which a block 47 is freely slidable. One end of the taper control lever 48 is positioned between the parts 40 and 43 on the axial center line of the plunger mechanism and is provided on its opposite side faces with pivot studs 49 and 50, respectively, having their axes spaced apart longitudinally of said lever. The stud 49 is pivotally engaged in a recess or opening 51 in the sliding block 47 while the other stud 50 is similarly engaged in the recess or opening 53 of a bar 52, perpendicularly disposed relative to the plunger axis and within recess 44' formed in the inner face 44 of the part 43 of rear plunger section 29. One end of this bar 52 extends transversely through a short longitudinal slot 54 in one side of the body 10 while the other end portion of said bar extends through a relatively long slot 55 in the opposite side of said body. This slot is also comparatively wide, as seen in Figure 5, to accommodate the lever 48 for movement relative to the bar 52. The opposite ends of the bar 52 have sliding contact with the base walls of diametrically opposed internal grooves 56 in the wall of the sleeve 12 and in the set condition of the plunger mechanism have abutting contact with flat shoulders 58 formed on the inner ends of cylindrical studs or pins 57 fixed in the wall of said sleeve. Bar 52 thus acts to limit forward movement of sleeve 12 relative to body 10, while said sleeve prevents transverse movement of the bar with respect to the plunger mechanism. This construction, in effect, provides a fixed pivotal connection between the taper control lever 48 and the rear plunger section 29 and a relatively spaced, transversely shiftable pivotal connection between said lever and the plunger section 28.

Intermediate the ends of one of the grooves 56 the wall of sleeve 12 is provided with an opening 59 through which the other or outer end of the lever 48 projects and centrally thereof this opening is cylindrically enlarged, as at 60, to receive a cylindrical boss 62 formed on one end of a bracket member 61. This bracket member is of general rectangular form, as seen in Figure 7, and is centrally provided with a cylindrical bore 63 extending therethrough in concentric relation to the boss 62. This bore and the boss are axially bisected by a slot 64 in which the end of lever 48 is received. The other end of the bracket is, preferably, provided with a separable cover plate 65 for the bore 63 and slot 64 and said plate is retained in assembled relation with the bracket body and said assembly detachably secured in rigidly fixed relation to the sleeve 12 by means of a plurality of screws 66.

With particular reference to Figures 1, 2 and 5, it will be noted that the outer end of the taper control bar 48 is provided with a longitudinally elongated, rectangular slot 67. This slot receives an adjustable fulcrum block 68 for said end of the lever, said block being provided with axially aligned, oppositely projecting trunnions 69 pivotally engaged, respectively, in the recess or opening 71 of one of a pair of like semi-cylindrical members 70, slidably engaged with the walls of the bore 63 in bracket 61.

For the purpose of regulating the operation of the plunger mechanism in order to vary the thread taper in small increments, as may be required, there is stamped in one face of the lever 48, at one side edge of the slot 67, a graduated scale 72 (see Figure 8). Adjacent to the scale 72 a key lug 73 projects into the slot 67 and is adapted for engagement in any one of the notches or recesses 74 formed in the edges of the rectangular block 68. It will be noted that a single recess is provided in each edge of the rectangular block and these recesses are located at relatively different distances from the edges of the block which extend at right angles to the edge in which the recess is formed. In the drawings the block 68 is shown with one of its edges in register with zero on the scale 72 for a basic taper, say ¾ inch to the foot. By adjusting the position of block 68 in the slot 67 and engaging the key lug 73 in another selected recess 74, another edge of the block is positioned relative to the scale to vary the taper plus or minus. Of course, for the purpose of making more minute adjustments, additional recesses may be provided in the edges of the block. Such taper variation is caused by the fact that adjustment of block 68 variably positions the fulcrum trunnions 69 and members 70 lengthwise of lever 48 with respect to the pivotal connection 49 between said lever and plunger section 28, which in turn variably controls the extent of receding movement of plunger sections 28 and 22 relative to plunger section 29, as will presently be more fully explained.

A strong coil spring 75 in the bore 76 of the shank extension 11 of the body has its closely engaged forward end convolutions 77 threaded on a screw stud projecting from the rear end portion 45 of the plunger section 29. The closely engaged rear end convolutions 78 of said spring are engaged with the external threads of a tubular nut 79 which is also internally threaded to receive the screw 80 whereby said nut is tightly held in engagement with the seat 81 at the rear end of bore 76. The sole purpose of the spring 75 is to rapidly retract the composite plunger mechanism as a unit after the receding function thereof and the threading operation has been completed.

In order to retain the several parts of the plunger mechanism in the set condition of Figure 1, at the start of the threading operation, I provide a novel latching means therefor, and an improved latch tripping device, which will now be described, with particular reference to Figures 3, 4 and 6 of the drawings.

Figure 6:
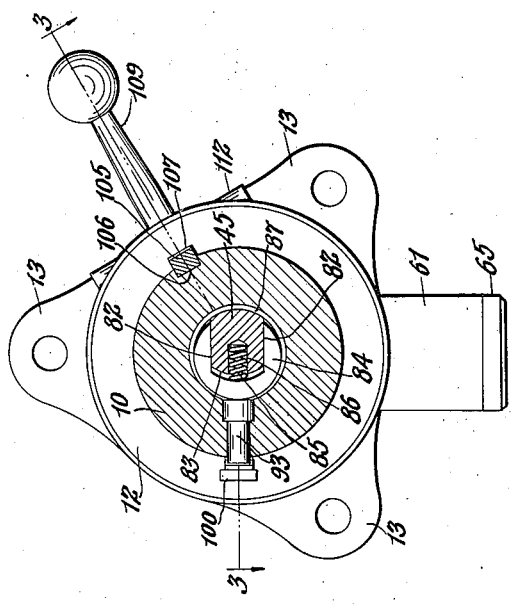
Figure 6 is a similar sectional view taken substantially on the line 6—6 of Figure 3.

The reduced rear end 45 of the plunger section 29 is provided at opposite sides thereof with the transverse grooves 82 connected at one of their ends by a circumferential groove 83 (see Figure 6). In these grooves a substantially U-shaped latching member 84 is engaged and yieldingly urged outwardly, to a normal position, in which its intermediate portion projects beyond the periphery of the plunger end 45, by a spring 85 seated in a recess 86 in the plunger.

The latching member 84 is adapted to coact with a relatively fixed keeper. In the present instance this keeper is in the form of a metal ring or annulus 87 which, I have found, has certain desirable practical advantages in the operation of the mechanism. This keeper ring is of appreciable width and is fitted into the rear end of the bore 27 in the body 10. The external diameter of the ring is such as to permit of its rotative adjustment relative to the bore and it is provided, substantially mid-way between its end edges, with a plurality of circumferentially spaced openings 88 having inwardly beveled edges 89. With the edge of one of these openings the inner tapered end 91 of a screw 90 threaded in an opening 92 in one side of the body 10 is tightly engaged to securely retain said ring in adjusted position, and with one end thereof in abutting contact with the rear end wall of the bore 27. In this manner the other end edge of the keeper ring is definitely positioned for cooperation with the latch member 84 and in relation to a flattened face 95 on the enlarged inner end 94 of a latch actuating pin 93. This pin is transversely movable in the opening 96 in body 10, the inner end thereof being counterbored, as at 97, to receive the enlarged end 94 of said pin. This end of the pin is received in a recess 94′ in the end of the part 42 of piston section 29 in the retracting movement thereof (see Figure 4). The outer end of the pin 93 has a beveled or inclined face 98 for coaction with a latch tripping key carried by the sleeve 12.

In alignment with the latch actuating pin 93 the wall of the sleeve 12 is provided with an internal longitudinally extending slot 99 to receive an elongated tripping key 100 of T-shaped form in cross section (see Figure 5). At its inner side this key has longitudinally spaced surfaces 101 and 102, respectively, reversely inclined longitudinally of the key. The key includes an end section 103 of reduced thickness extending beyond the surface 101 and so positioned relative to the outer end of pin 93 that it will not actuate the latter. The surface 102 is located at the other end of the key. Thus, by reversing the key, end for end, in the slot 99 said key will coact at the proper time with latch actuating pin 93 in cutting either long or short thread lengths. The extension 103 also assures the necessary bearing surface for the spaced locking screws 104 to securely fix the key in either of such positions in the groove 99.

The sleeve 12 is held against rotative movement relative to the body 10 to prevent frictional binding pressure against the ends of bar 52 and to retain the tripping key 100 in accurate alignment with latch actuating pin 93, by a sleeve guiding key 105 which is securely fixed in the longitudinal groove 106 in the periphery of the body 10. This key projects outwardly from the body and is engaged in the accurately milled internal key-way 107 of the sleeve 12 (see Figure 6).

The key 105 is provided at its forward end with a series of rack teeth 108 with which the teeth of a segmental pinion 110 formed on one end of a re-setting lever 109 are adapted to coact. This lever is pivotally mounted, in an opening 111 in the sleeve, 12, upon the pin 112 which is suitably fixed at its opposite ends in said sleeve.

Having described the co-operative relationship of the several elements of my new thread cutting mechanism, the operation thereof may be readily understood. Referring first to Figures 1 and 3 of the drawings where the several parts are shown in relative position after the multi-sectioned plunger has been set to expand the cutters or chasers to position for engagement with the work, as said cutters enter the end of the pipe or tube, the ring 14 engages the pipe end or other stationary part. Therefore, as the thread cutting operation progresses, the connecting rods 15 move the sleeve 12 rearwardly on the body 10. The upper end of taper control lever 48 being pivoted to the relatively fixed bar 52, the outer end of said lever also moves rearwardly and outwardly, the fulcrum members 70 for said end of the lever sliding freely in the bore 63. It will also be obvious that the pivot connection 49 between said lever and plunger section 28 is angularly moved in a rearward direction relative to the pivot connection 50 between said lever and the fixed bar 52, the block 47 sliding transversely in the groove 46. As the plunger section 28 is connected by adjusting rod 30 with the plunger section 22, in this relative angular movement between the pivots 49 and 50, said plunger sections will move rearwardly as a unit relative to the rear plunger section 29. The plunger head 23 is thus drawn rearwardly to recede the cutting elements 20 or move the same inwardly towards the plunger axis synchronously with the generation of the thread.

The thread cutting operation and rearward movement of the sleeve 12 continues, until, in accordance with the setting of the key 100 for a pre-determined thread length, one of the inclined surfaces 101 or 102 on the key contacts the inclined face 98 on the outer end of pin 93 and presses said pin inwardly. As seen in Figure 3 this inward movement of pin 93 will force the latch member 84 inwardly on the plunger end 45 against the resistance of spring 85, thus disengaging said latch member from contact with the forward end edge of the keeper ring 87. Substantially simultaneously with the tripping of latch member 84 the spring 75 contracts and moves the three plunger sections 22, 28 and 29 rearwardly as a unit, thus retracting the cutting elements from the work to the position shown in Figure 2. This movement is limited by contact of the end 45 of plunger section 29 with the rear end wall of bore 27 in the body 10.

From a comparison of Figures 1 and 2 it will be noted that in the receding action of the plunger mechanism, as the sleeve 12 moves rearwardly, the outer end of lever 48 turns or pivots relative to the fulcrum members 70 as said members slide outwardly in the bore 63, while said lever moves, in synchronous relation with the thread cutting action, from the obliquely inclined position with respect to the plunger axis, as in Figure 1, towards, and in some cases, past a position at right angles to said axis, as seen in Figure 2. The final position of said lever at the end of the receding action is determined and controlled by the adjustment of the fulcrum block 68 for said lever for a desired taper and the adjustment of tripping key 100 for a desired thread length.

In the final cutter retracting or collapsing action of the plunger mechanism the end 45 of plunger section 29, carrying the latching member 84, is positioned within the tubular keeper member or ring 87, as seen in Figures 2 and 4, said plunger end having a length slightly exceeding the width of the ring to avoid possible mutilation of the forward end edge of the ring by violent impact of the end shoulder of plunger part 42 therewith.

In the retracting action the ends of bar 52 are moved rearwardly relative to sleeve 12 in the grooves 56 thereof one end of said bar being positioned relative to the rear end of slot 54 in the body 10, substantially as seen in Figure 2. It will also be noted that, by the sliding movement of sleeve 12 which controls the receding action, the pins 57 carried by said sleeve are now positioned in rearwardly spaced relation from the ends of bar 52.

To re-set the mechanism with the parts thereof relatively positioned as seen in Figure 1, the sleeve 12 is moved forwardly on the tool body 10, from the position of Figure 2, either by means of a yoke operating mechanism, (not shown), exerting pressure against the rear end of the sleeve, or by gravity movement of the yoke if the tool is operated in a vertical position. This movement of the sleeve is, of course, accompanied by a corresponding movement of ring 14 and bracket 61, which returns or restores lever 48 to the position of Figure 1. Such forward movement of the sleeve 12 is finally arrested by the engagement of pins 57 with the rear edge of bar 52 and at this time the teeth 110 of the re-setting lever 109 are in position to engage rack teeth 108 on key 105.

The rearward movement of sleeve 12 which caused the receding action of the plunger mechanism has now all been removed and the parts are in position for the final re-setting step. This may be accomplished in either one of two ways, viz., by applying further pressure against the rear end of sleeve 12 or by moving lever 109 from the position of Figure 4 to the position of Figure 3, relative to said sleeve. In either case, a further forward movement of the sleeve causes the pins 57 to exert pressure against the rear edge of bar 52, said bar and sleeve now moving as a unit with respect to the body 10. Since bar 52 is keyed to the rear plunger section 29 and connected with plunger section 28 through lever 48, moving with said sleeve, the three plunger sections 29, 28 and 22 are now moved forwardly as a unit. This unitary plunger movement occurs in opposition to the resistance of spring 75, which is expanded and placed under tension, simultaneously with the radial expansion of cutter elements 22 to operative position by the plunger head 23.

This forward expanding action of the plunger mechanism continues until the rear edge of latch member 84 coincides with the forward edge of the relatively fixed keeper ring 87. Spring 85 then acts to force the latch member 84 outwardly and position its intermediate portion in overlapping engagement with a part of the edge face of the keeper ring and in contact with the inner end of latch actuating pin 93, which is also forced outwardly to normal position by the spring 85, as determined by contact of the end 94 of the pin with the base of counterbore 97. All parts of the mechanism are now fully restored to the relative positions illustrated in Figures 1 and 3, in condition for another threading operation.

From the above description, the several novel features of my improved thread cutting mechanism, as well as the manner in which the mechanical parts thereof are functionally co-related or co-ordinated to accomplish the intended practical results of the invention, will be clearly and fully understood. Of primary importance to the realization of a high degree of accuracy in the cutting of taper threads is the material simplification which I have devised in the taper control train of mechanism in contrast with prior tools of this kind. Thus, I employ a comparatively small number of simply constructed parts which are incorporated in a compact organization, in which lost motion between relatively moving parts has been completely eliminated. Also, sliding motion between relatively movable and stationary parts has been reduced to a minimum, whereby taper accuracy will not be seriously affected by frictional wear, and the receding action of said mechanism takes place entirely independently of the retracting or collapsing spring or other means yieldingly resisting such action, which assures uniformity of thread taper. Since the plunger section 29 has but one latched position, the spring 75 will have the same tension for all thread tapers and diameters within the range of the tool. These desirable functional attributes of my invention are, in large degree, due to my novel multi-sectional expanding, receding and retracting plunger mechanism and the means which I employ for co-operatively connecting the taper control lever therewith.

It will further be noted that in the present construction I avoid the use of wedges, eccentrics, cams, or the like having extensive wearing surfaces, as in the patents above referred to, and which, after a short period of use, produce an inaccurate taper or require the addition of complicating adjusting devices.

The accurate control of thread length provided by my invention, in the plunger latching means and the adjustable and reversible tripping key therefor, is also an important contribution to the practical utility of such tools. In this connection, and as distinguished from Patent 2,291,744, the simple and inexpensive type of adjustable latch keeper ring 87 is to be particularly noted. Thus, when one point on the end edge face of the ring shows signs of wear, said ring may be rotatively adjusted and the end of screw 90 engaged in another of the openings 88 to present another edge surface portion of the ring for engagement by the latch member 84. After this adjusting operation has been repeated for as many times as there are openings 88 in the keeper ring, the position of said ring in the bore 27 of tool body 10 may then be reversed to locate the other end edge face of said ring for adjustment in a similar manner with respect to the latch member 84. Therefore, in all probability, this keeper ring will out-last the serviceable life of the tool. However, should it become unduly worn, it may be readily replaced at very nominal expense.

This adjustable latch keeper insures unfailing outward expansion of the cutting elements 20 in each re-setting operation of the plunger mechanism to precisely the same cutting position at the start of each threading operation, with positive coaction between latch member 84 and the keeper ring to lock said mechanism against collapse. Therefore, after tripping key 100 has been properly adjusted on the sleeve 12, as above explained, in accordance with the predetermined thread length to be cut, each operation of the tool will produce accurately tapered threads of exactly the same length on the work.

Further, it will be seen that, as in the patent last referred to, I provide a simple and easily adjustable means to vary the taper in small increments, plus or minus from a basic value, but, unlike said patent, this adjusting means is normally inaccessible and is of such construction that accidental or unintentianal disturbance of the adjusted setting is impossible.

Finally, it may be said that my present improvements provide a greatly simplified, compactly and ruggedly constructed thread cutting mechanism of this type, embodying new principles of construction and operation, whereby, as distinguished from prior efforts in this art, I am able to acceptably meet the exacting demands of modern industry for extreme accuracy and consistently uniform results.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a thread cutting machine, a body provided with a plurality of thread cutting elements radially movable towards and from a common center, plunger mechanism comprising relatively movable parts mounted in said body and one of said parts having an axially movable plunger head cooperatively connected with said cutting elements to recede the same from the work during the threading operation, means for releasably latching the plunger mechanism against movement relative to the body to retain the cutting elements in expanded operative positions, and means interposed between and connected with the relatively movable parts of the plunger mechanism to independently actuate the plunger head and recede the cutting elements from the work in predetermined ratio to the progressive thread cutting action of said elements to form a tapered thread.

2. The thread cutting machine defined in claim 1 in which said relatively movable parts of the plunger mechanism are operatively mounted in sliding contact with the wall of a uniform diameter bore in said body.

3. The thread cutting machine defined in claim 1, and an operating member for said last named means longitudinally slidable on said body.

4. The thread cutting machine defined in claim 1, together with a collapsing spring connected to one of said plunger parts, and means for releasing said latching means at the end of the receding movement of the cutting elements, whereby the plunger mechanism is moved as a unit in one direction to collapse said elements to inoperative position.

5. In a thread cutting machine, a body provided with a plurality of thread cutting elements radially movable towards and from a common center, plunger mechanism including complementary parts of equal diameters axially movable in said body relatively to each other and a plunger head rigidly connected to one of said parts and operatively connected to the inner ends of said cutting elements to expand, recede and collapse the same, a taper control lever operatively connected at one of its ends with each of said plunger parts, and means mounted on said body and operatively connected with the other end of said lever to synchronously actuate said lever in the progressive thread cutting action of said elements to impart an independent axial movement to the connected plunger part and head and recede the cutting elements from the work to form a tapered thread.

6. The thread cutting machine defined in claim 5 in which said relatively movable plunger parts have transversely spaced apart opposed end portions and said taper control lever is positioned therebetween.

7. The thread cutting machine defined in claim 5 in which said taper control lever has a fixed pivotal connection with one of said plunger parts and a pivotal connection with the other of said plunger parts which is angularly movable in relation to said fixed pivot and with respect to the plunger axis, in the actuation of said lever.

8. In a collapsible tap of the receiving type, a body having a cutter head provided with radially expansible and retractible cutting elements, plunger mechanism mounted in said body including complementary parts of equal diameters axially movable relative to each other, means for expanding and retracting the cutting elements, operatively connected to one of said plunger parts, a thread taper control lever having a fixed pivotal connection to the other of said plunger parts, a transversely shiftable pivotal connection between said lever and the first named plunger part, spaced from said fixed pivot longitudinally of the lever, and means operatively connected with said lever to synchronously actuate the same in the progressive thread cutting action of said elements and impart an independent axial movement to the first named plunger part and said expanding and retracting means in retracting direction to recede the cutting elements from the work and form a tapered thread.

9. The collapsible tap defined in claim 8, together with a collapsing spring urging the plunger mechanism to normal position to collapse the cutting elements, and latch means releasably retaining the plunger mechanism in expanding position including a latch keeper member mounted in the plunger bore of said body.

10. The collapsible tap defined in claim 8 in which said last named means includes a member movably mounted on said body, together with a collapsing spring urging the plunger mechanism to normal position to collapse the cutting elements, an element rigidly connected with the plunger part having fixed pivotal connection with said lever and adapted to coact with said member, to axially move the plunger parts as a unit in opposition to said spring and expand the cutting elements to operative position and latch means for releasably locking the plunger mechanism in the latter position during the receding action thereof.

11. In a collapsible tap of the receding type, a body having a cutter head provided with radially expansible and retractible thread cutting elements, plunger mechanism mounted in said body co-acting with said elements to expand, recede, and retract the same to collapsed position, a spring urging said plunger mechanism to a normal cutter collapsing position, means for latching said mechanism against movement to said normal position to retain the cutting elements in expanded position, and means synchronously operable with the progressive thread cutting operation of said elements in the latter position of the plunger mechanism to recede said elements from the work, said means including a taper control lever operatively connected to relatively movable parts of the plunger mechanism, a sleeve slidable on said body, and fulcrum means for one end of said lever carried by said sleeve and bodily movable in the operation of said sleeve radially of the plunger axis.

12. The collapsible tap defined in claim 11 together with a guide bracket enclosing said end of the lever and its fulcrum means and detachably secured to said sleeve.

13. The collapsible tap defined in claim 11 in which said fulcrum means comprises a fulcrum locating member adjustable lengthwise of the lever towards and from the plunger axis to vary the thread taper.

14. The collapsible tap defined in claim 11 together with a guide bracket secured to said sleeve, said fulcrum means including a fulcrum support mounted on said bracket for movement radially of the plunger axis, a member having a fulcrum stud engaged with said support, and means for adjustably connecting said member with said lever to position the fulcrum stud lengthwise of the lever and vary the thread taper.

15. The collapsible tap defined in claim 11 together with means for tripping said latch mechanism at the end of the receding movement of the cutting elements, comprising an elongated key having longitudinally spaced latch tripping portions and means for reversibly and adjustably securing said key to the sleeve in parallel relation to the axis thereof.

16. In a collapsible tap, a body having a cutter head provided with radially expansible and retractible thread cutting elements, a plunger mounted in said body and operatively connected with said elements to expand and retract the same, a spring urging said plunger in one direction to retract the cutting elements to collapsed position, means for moving the plunger in the opposite direction to expand said elements to cutting position, and latch means to retain the plunger in the latter position against the action of said spring, comprising a spring pressed latching element mounted on the plunger, and a relatively fixed keeper member adjustably mounted on said body and having a plurality of surface portions adapted to be selectively positioned for latching engagement with said latching element.

17. The collapsible tap defined in claim 16 in which said latch keeper member comprises a rotatively adjustable ring contacting the end wall of the plunger bore in said body and means is provided to retain said member in its adjusted position.

18. The collapsible tap defined in claim 16 in which said latch keeper member comprises a flat metal ring adapted for reversible positioning in the plunger bore in said body, in rotative contact with the circumferential wall thereof, and with one of its end edges in contact with an end wall of said bore, and means for securing said ring in any one of a plurality of rotatively adjusted positions to present a selected portion of the other end edge of the ring for latching engagement with said latching member.

19. In a collapsible tap, a body having a cutter head provided with radially expansible and contractible thread cutting elements, a plunger mounted in said body and operatively connected with said elements to expand and retract the same, a spring urging said plunger in one direction to retract the cutting elements to collapsed position, means for moving the plunger in the opposite direction to expand said elements to cutting position, said latter means including a longitudinally slidable sleeve on said body, means to prevent rotative movement of the sleeve on the body, manually operable means carried by the sleeve and co-acting with a part of said last named means to slide said sleeve in one direction and move the plunger to expand said cutting elements and means for latching the plunger in the latter position.

20. The collapsible tap defined in claim 19 in which the means for preventing rotative movement of the sleeve includes a sleeve guiding key fixed to said body and having rack teeth at one end, and said manually operable means comprises a lever pivotally mounted on the sleeve and having a segmental pinion co-acting with said rack teeth.

21. In a thread cutting mechanism, a body provided with a plurality of thread cutting elements radially movable toward and from a common center, plunger mechanism including complementary parts axially movable in said body relative to each other, means operatively connecting one of said parts to the cutting elements to expand and recede the same with respect to the work, a taper control lever operatively connected at one of its ends to the said plunger parts, and means operatively connected with said lever to actuate the same and impart a synchronous axial movement to the latter plunger part in the progressive thread cutting action of said elements, to recede said elements from the work and form a tapered thread.

22. In a thread cutting machine, a body provided with a plurality of thread cutting elements radially movable toward and from a common center, plunger mechanism mounted in said body including parts having independent coaxial movement relative to the body, means operatively connecting one of said parts to the cutting elements to expand and recede the same with respect to the work, means for releasably latching the plunger mechanism against movement relative to the body to retain the cutting elements in expanded operative position, and means operatively connected to the plunger mechanism to impart an independent axial movement to the last named plunger part in synchronism with the progressive thread cutting action of said elements and recede the cutting elements from the work to form a tapered thread.

23. The thread cutting mechanism defined in claim 22, in which said last named means comprises a lever pivotally and slidably supported at one of its ends on the body and operatively connected at its other end with each of said plunger parts.

24. For use in a collapsible tap having a body and a reciprocal tap expanding and collapsing plunger therein provided with a yieldable latching element; a keeper member adapted to be fitted in the plunger bore and having a plurality of surface areas for selective engagement with said latching element to retain the plunger in tap expanding position.

25. The invention defined in claim 24, wherein said keeper member is of cylindrical form and provided with an arcuate surface substantially concentric with its axis embodying a plurality of surface areas for selective engagement with said latching element.

26. For use in a collapsible tap having a body and a reciprocal tap expanding and collapsing plunger therein provided with a yieldable latching element; a tubular keeper member adapted to be fittted in the plunger bore to receive an end of the plunger when in collapsed position and having an end surface to coact with said latching element and retain the plunger in tap expanding position.

FREDERIC NELL.